J. T. CLARK.
SPRAYING APPARATUS.
APPLICATION FILED JUNE 19, 1916.
1,261,101.
Patented Apr. 2, 1918.
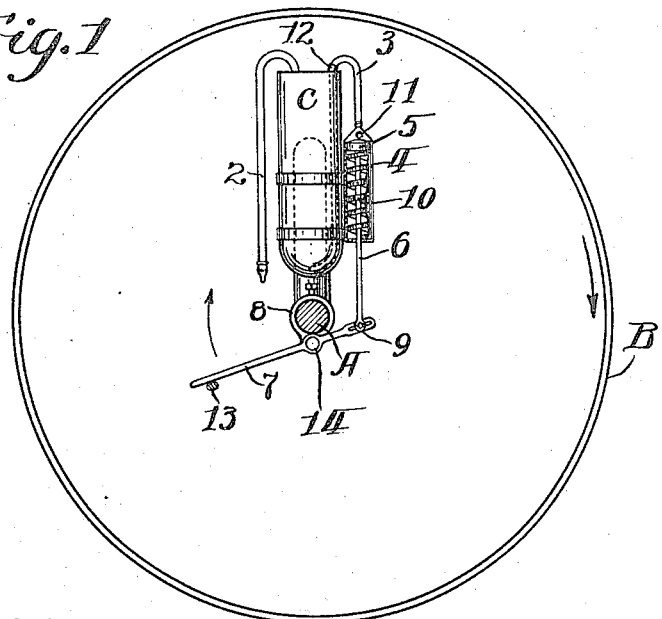
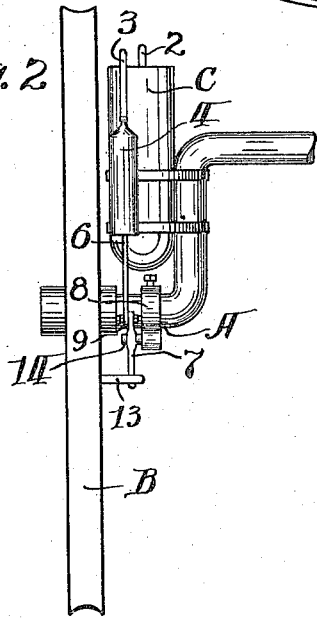
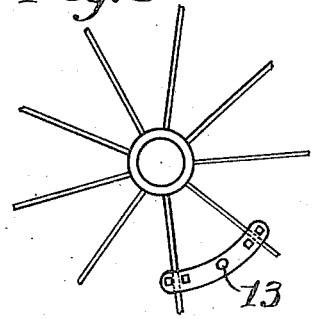
Inventor:
Joseph T. Clark
by: Lathrop Johnson
his Att'ys.

U N I T E D   S T A T E S   P A T E N T   O F F I C E.

JOSEPH T. CLARK, OF DE GRAFF, MINNESOTA.

SPRAYING APPARATUS.

1,261,101.                Specification of Letters Patent.       Patented Apr. 2, 1918.

Application filed June 19, 1916. Serial No. 104,398.

*To all whom it may concern:*

Be it known that I, JOSEPH T. CLARK, a citizen of the United States, residing at De Graff, in the county of Swift and State of Minnesota, have invented certain new and useful Improvements in Spraying Apparatus, of which the following is a specification.

My invention relates to improvements in spraying apparatus, its object being particularly to provide a spraying attachment for cultivators actuated in a simple manner from the wheel to maintain an air pressure for the spraying liquid.

To this end my invention consists of the features of construction and combination hereinafter particularly described and claimed.

In the accompanying drawings forming a part of this specification,

Figure 1 is a section through the transverse shaft of the cultivator showing a side elevation of the spraying device supported thereon.

Fig. 2 is an elevation taken at right angles to Fig. 1 and

Fig. 3 is a detail of a portion of the cultivator wheel and one element of my invention carried thereby.

Referring to the drawings A represents the transverse shaft of a cultivator and B supporting wheels. Suitably supported by the cultivator is a container C for holding the spraying liquid, said container being formed with an outlet pipe 2 provided with a suitable discharge nozzle.

3 represents an inlet pipe leading from a piston chamber 4 to the container. The inlet pipe preferably extends downwardly to the bottom of the container as shown in dotted lines in Fig. 1. Within the piston chamber is a piston rod 6 connected with a lever arm 7 extending across the shaft A. The lever arm 7 may be supported from the shaft A as by means of a collar 8 forming journal support 14 for the lever arm. The connection between the rod 6 and the end of the lever arm is preferably in the form of a slot and pin connection 9 which may be adjusted to regulate the throw of the piston rod. The piston is normally held raised as by a coil spring 10 around the piston rod between the piston 5 and the bottom of the chamber. A one-way inlet air valve 11 is shown provided in the piston chamber above the piston and also a similar one-way valve 12 is positioned in the pipe 3 to allow passage of air from the piston chamber into the liquid container and to stop any return passage. Secured upon the spokes is an outwardly projecting pin 13 in position to strike the lower end of the lever arm 7 in the rotation of the wheel.

In operation, with the container C partly filled with the spraying liquid, the rotation of the wheel in the travel of the cultivator will, as the pin 13 strikes and passes the lever 7, turn said lever to lower the piston and draw air into the piston chamber, the spring returning the piston to a raised position and forcing the air from the chamber into the liquid container to make air pressure upon the contained liquid. As the air pressure within the liquid container reaches a point overbalancing the spring it will result in the spring being unable to force the air past the valve 12, and consequently in the spring being gradually depressed within the chamber by the pressure of the air above the piston, lowering the piston and turning the lever 7 out of position to be actuated by the pin 13. Thus in the travel of the cultivator the parts automatically act to maintain a predetermined air pressure within the liquid container, regardless of the height of the liquid therein.

I claim:—

1. In combination with a shaft and supporting wheel, an adjacently supported liquid container and means for compressing air within said container comprising a piston chamber connected with said container, a piston slidable in said chamber, spring means for holding said piston raised, a horizontal lever arm having fulcrum support upon said shaft, a connection between one end of said lever and said piston, the opposite end of said lever projecting some distance beyond said shaft and means projecting inwardly from the wheel for engaging with said projecting lever end in the manner and for the purpose set forth.

2. In combination with a shaft and supporting wheel, an adjacently supported liquid container and means for compressing air within said container comprising a piston chamber connected with said container, a piston slidable in said chamber, spring means for holding said piston raised; and means for actuating said piston, comprising a cross lever having removable fulcrum support upon said shaft below said piston, one end of said lever being connected with the piston and the other or free end of said lever projecting some distance beyond said shaft alongside the supporting wheel and an inwardly projecting pin carried by said wheel in position to engage with the free end of the lever for the purpose set forth.

In testimony whereof I affix my signature in presence of two witnesses.

JOSEPH T. CLARK.

Witnesses:
J. P. THORNTON,
LEONARD BERGSTROM.

Copies of this patent may be obtained for five cents each, by addressing the "Commissioner of Patents, Washington, D. C."